(12) United States Patent
Kalandek et al.

(10) Patent No.: US 6,371,518 B1
(45) Date of Patent: Apr. 16, 2002

(54) AIR BAG, MODULE AND METHOD OF FOLDING A SIDE AIR BAG OR CUSHION

(75) Inventors: Bruce Kalandek, Dearborn; Paul Wipasuramonton, Rochester, both of MI (US); James Schierbeek, Yokohama (JP)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/510,821

(22) Filed: Feb. 23, 2000

(51) Int. Cl.$^7$ ............................................... B60R 21/16
(52) U.S. Cl. .................. 280/743.1; 280/730.1
(58) Field of Search .............................. 280/743.1, 729, 280/730.1, 730.2

(56) References Cited

U.S. PATENT DOCUMENTS

| | | | | |
|---|---|---|---|---|
| 5,240,282 A | * | 8/1993 | Wehner et al. | 280/743.1 |
| 5,501,489 A | * | 3/1996 | Folsom et al. | 280/743.1 |
| 5,667,243 A | * | 9/1997 | Fisher et al. | 280/730.2 |
| 5,899,490 A | * | 5/1999 | Wipasuramonton et al. | 280/730.2 |
| 5,992,882 A | * | 11/1999 | Ito et al. | 280/743.1 |
| 6,186,544 B1 | * | 2/2001 | Igawa | 280/743.1 |
| 6,196,585 B1 | * | 3/2001 | Igawa | 280/743.1 |
| 6,213,500 B1 | * | 4/2001 | Jost et al. | 280/730.2 |

* cited by examiner

Primary Examiner—Kenneth R. Rice
Assistant Examiner—Lynda Jasmin
(74) Attorney, Agent, or Firm—Markell Seitzman (57) ABSTRACT

A method of folding an air bag, the air bag having facing first or upper and second or lower panels that are joined together, a portion of each panel cooperating to form a neck or inlet which is adapted to receive an inflator, the method comprising the steps of:

a) arranging the first and second panels to be generally flat on a work surface with the a first panel overlaying a second panel;

b) defining a first fold or tuck line that extends across the first panel;

c) forming a double tuck in both the first and second panel, the first tuck located on a preferred portion of the first and second panels generally at the first tuck line and the second tucks generally located near the bottom of the air bag; the tucking of the panels lowering the height of the air bag in relation to its laid-out configuration in step a as well is its relating to the first tuck line;

d) reducing the width of that portion of the air bag that extends from the second tuck to the top of the air bag;

e) folding or rolling the reduced width portion toward the first fold line, the folding forming a fabric roll, the fabric roll after the rolling or folding of this step being positioned generally in line with the first fold line;

f) manipulating the fabric roll so that lies generally parallel to the inflator and generally positioned between the tucks formed in the panels as a result of step c;

g) reducing a first dimension of the partially folded air bag, the first dimension measured from the location of the inflator to an opposing side of the partially folded air bag.

h) folding over a portion of the air bag to reduce a second dimension of the air bag measured from the inflator to a side opposite the inflator to obtain a generally trapezoidal configuration for the folded air bag.

9 Claims, 5 Drawing Sheets

AIR BAG, MODULE AND METHOD OF FOLDING A SIDE AIR BAG OR CUSHION

BACKGROUND AND SUMMARY OF THE INVENTION

The invention generally relates to air bags for safety restraint systems as well as to a method of folding an air bag used to protect an occupant in a side impact or crash.

Many side impact air bags are installed within the outer portion or wing of an occupant seat or fascia of a door adjacent the seat. Upon inflation, the air bag must tear through the seat's covering material (or door fascia) and thereafter position itself at the proper orientation to protect the occupant during the side impact collision. The positioning of the air bag within the seat and the construction of the covering material have an effect on the way the air bag inflates.

Additionally, it is well known in the art that the method of folding affects the trajectory of the inflating air bag.

One of the design criteria for side impact air bags is an improved interaction with the out-of-position occupant, that is, the occupant that is not in the normal, upright seated position. While adults will generally be seated upright or perhaps seated leaning over against the adjacent door, children are apt to be seated in many unusual positions.

It is an object of the present invention to provide an improved air bag and air bag module which utilizes an improved method of folding the air bag such that the head chamber of the air bag is deployed in a more vertical direction, thereby reducing any forward or longitudinal component of force exerted by the deploying air bag on the occupant and more particularly on an occupant that is out of position.

Accordingly the invention comprises: a method of folding an air bag, the air bag having facing first or upper and second or lower panels that are joined together, a portion of each panel cooperating to form a neck or inlet which is adapted to receive an inflator, the method comprising the steps of:

a) arranging the first and second panels to be generally flat on a work surface with a first panel overlaying a second panel;

b) defining a first horizontal fold or tuck line in the first panel;

c) identifying an upper portion of the first panel that is located above the first fold line, and tucking this upper portion behind a lower portion of the first panel and pushing a part of the upper portion generally to the bottom of the air bag, the tucking of the upper portion at the first fold line creating a first fold or tuck in the first panel at the first fold line and the moving the first panel to the bottom creating a second fold near the bottom, the first panel extending from the second fold, beyond the first fold line so that the top of the air bag is a determinable distance from the first fold line; the above step lowering the height of the air bag in relation to its laid-out configuration in step a;

d) identifying a first vertical fold line in the upper portion of the air bag, this first fold line generally extending across the upper portion from the second fold to the top of the air bag;

e) folding the upper portion generally about the first vertical fold line to reduce the width of the upper portion;

f) folding or rolling the upper portion toward the first fold line, the folding forming a fabric roll, the fabric roll after the rolling or folding of this step is positioned generally in line with the first fold line;

g) rotating the fabric roll so that an end there that was pointing toward the inflator is positioned facing the bottom of the air bag and a top of the roll now lying adjacent the location of the inflator;

h) moving a portion of the air bag generally opposite the repositioned fabric roll toward the location of the fabric roll and in doing so, forming two opposing pleats in the upper and lower panels, wherein both of the pleats are positioned to lie behind the fabric roll, that is, positioned closer to the lower panel;

i) identifying an angled fold line in the partially folded air bag j) moving a corner of the air bag about the angle fold line generally toward the inflator to form a generally trapezoidal configuration of the folded air bag; enveloping the air bag with a tearable cover. Many other objects and purposes of the invention will be clear from the following detailed description of the drawings.

DETAILED DESCRIPTION OF THE DRAWINGS

Figure 1:
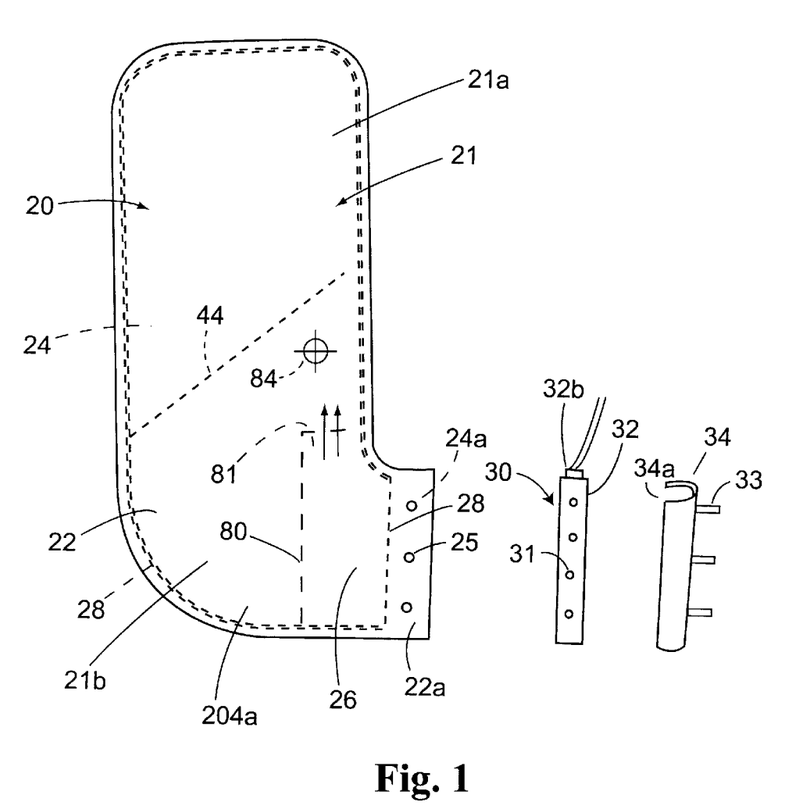
FIG. 1 shows a plan view of an air bag laid flat on a work surface with an air bag inflator adjacent to the neck of the air bag.

FIG. 1 illustrates an air bag 20 formed by joining two main panels 22 and 24 together. These panels comprise at least a first or outer panel 22 and second or inner 24 panel of material. Panel 24 is not visible in FIG. 1 as it is below panel 22. The inner and outer designation of the panels refers to the placement of the panels of the deployed air bag in relation to the side of the vehicle, that is, the outer panel is adjacent the vehicle side while the inner panel is adjacent the occupant to be protected. The various panels of the air bag are often made from woven nylon or polyester or a plastic film. The air bag 20 includes a neck portion 26 into which is placed an inflator subassembly 30, which can be accomplished in many different ways. In one embodiment the inflator subassembly 30 comprises an inflator 32 with a plurality of exit openings 31 through which inflation gas exits into the air bag. The subassembly 30 may also include a cylindrically shaped housing or manifold 34. The housing or manifold 34 can have a full wall such as shown in U.S. Pat. No. 5,765,867 or an open side 34a and also a plurality of mounting studs 33. The inflator 32 is received within the housing through the open side and supported and secured in the housing 34 by known means such as a strap or wire or band clamp (not shown) that envelopes the housing and inflator. In an alternate configuration, the studs 33 can extend directly from the inflator. In this case the housing 34 or manifold would most probably be eliminated.

Figures 2, 2A:
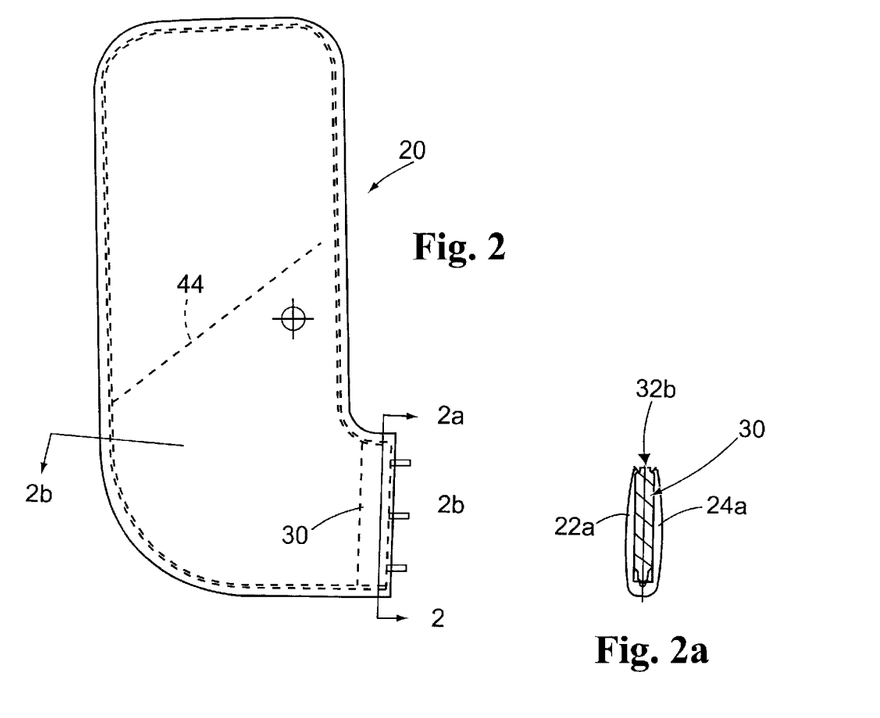
FIG. 2 is essentially identical to FIG. 1, however, the inflator has been moved within the neck of the air bag and the air bag flaps positioned about the inflator.
FIG. 2a is a cross-sectional view through section 2a—2a of FIG. 2.
Figure 2B:
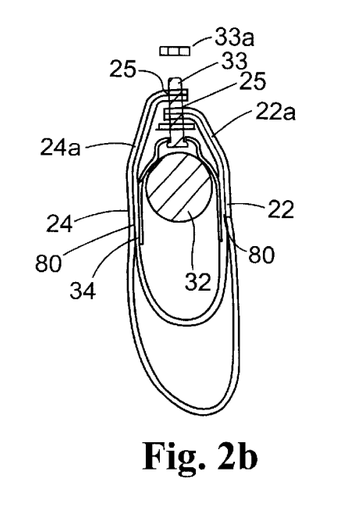
FIG. 2b is a cross-sectional view through section 2b—2b of FIG. 2 showing air bag inflator and housing positioned within the neck of the air bag.

As can be seen from FIG. 1 the two panels are joined together along a peripheral seam 28, which extends about most of the periphery of the bag. In the illustrated embodiment the seam 28 is a sewn seam. As is known in the art the seams can also be formed by heat welding or gluing the panels together. Each of the panels 22 and 24, in the vicinity of the neck 26, includes a respective flap 22a and 24a and each flap 22a and 24a has a plurality of openings 25. The number of openings 25 corresponds to the number of studs 33 of the subassembly 30. The inflator, or in this case the subassembly 30, is positioned inside (see FIG. 2) the neck 26, between the flaps 22a and 24a, and the flaps are placed in an overlapping relationship about the rear of the housing 34 (see FIG. 2a) with the stud 33 extending through a corresponding opening 25 in each flap.

Reference is again briefly made to FIG. 2. This figure differs from FIG. 1 in that the inflator is shown within the neck 26 of the air bag with the flaps about the housing 34. In this configuration the top 32a of the inflator 32 extends slightly from the neck 26. This relationship is exemplary of an inflator in which its electrical connector 32b (see FIG. 2a) is located in the inflator's top end and easy access to this connector is desired. The inflator can be totally enveloped by the neck of the air bag where an associated electrical wire is passed through a small opening in an obscure location on the air bag.

Figure 1A:
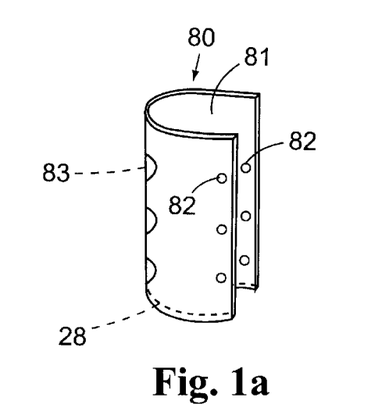
FIGS. 1a and 1b respectively show an optional diverter panel and a separator panel of the air bag.
Figure 1B:
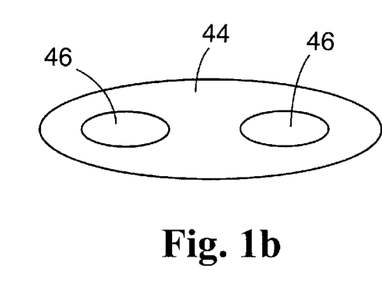

In the present invention, the inflatable portion 21 of the air bag is sufficiently long such that, when it is inflated, an upper portion thereof such as 21a provides protection for the occupant's head while a lower portion 21b provides protection for the occupant's thorax. While not necessary to the present invention, the air bag 20 may be constructed with a separator panel 44, which divides the inflatable portion (cushion portion) 21 into a head chamber 21a and a thorax chamber 21b. The separator panel, as shown in FIG. 1b, includes one or more openings 46 to permit the gas to flow from the thorax chamber to the head chamber of the cushion 21. In the preferred embodiment the separator panel 44 includes two oval openings, the size of each opening is about 44×110 mm. The air bag 20 may additionally include a diverter panel 80, shown in greater detail in FIG. 1a, that is positioned proximate the neck and sewn to the periphery of the air bag. When installed in the air bag, the panel 80 is folded and defines, in cooperation with adjacent portions of the panels 22 and 24, a passage with an open top portion 81. This panel 80 can also include a plurality of mounting openings 82 that are overlaid with the openings 25 in the panels 22 and 24. These openings 82 permit the diverter panel to also be placed in an overlapping relationship about the housing and studs. The lower portion of the diverter panel 80 is sewn to a respective side panel 22 or 24 along part of seam 28 or using a separate seam. The purpose of panel 80 is to change the direction of the flow of the inflation gases produced by the inflator 30 such that a greater portion of the inflation gases is directed upwardly through the air bag via the open top 81. The direction of gas flow as it exits the inflator is typically horizontal, at least in relation to FIG. 2. While not mentioned above, the outboard panel 22 may also include a discrete opening or vent (about 33 mm in diameter for example). In the preferred embodiment this vent 84 is located generally above the open top 81 of the passage formed by the diverter panel. Optionally the diverter panel 80 may also include another set of openings 83 (shown in phantom line). These openings permit a portion of the inflation gas to flow directly into the lower portions of the thorax chamber 21b.

Figure 3:
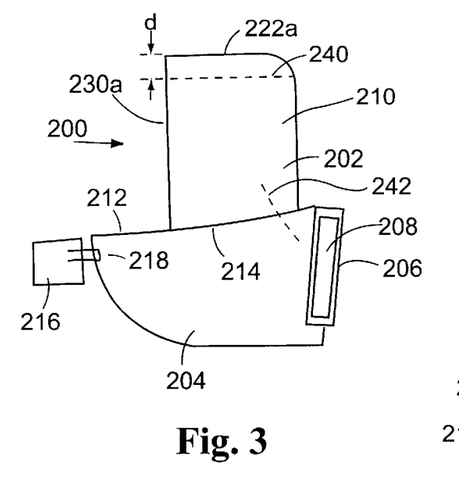
FIG. 3 is a plan view of an optionally folding jig or assembly.

The following describes a method for folding the air bag 20. To facilitate the folding process the air bag is positioned on a work surface which can comprise the top of a work table or a separate folding apparatus, pallet or jig 200. The use of a separate jig or folding apparatus will speed the folding process and result in greater uniformity from air bag to air bag. The folding apparatus 200 comprises a removable, shaped pallet or work surface 202. Alternatively, this folding apparatus can include the exterior dimensions of the jig 200 painted on the work table. The lower portion 204 of the work pallet 202 is shaped identical to the shape of the lower portion 204a (see FIG. 1) of the air bag 20. A corner of the apparatus 200 includes a first holding fixture 206 that includes a trough or depression 208 oriented to match the orientation of the inflator in the laid-out air bag. The trough is also shaped to conform to the shape of the inflator. The edges of the first holding fixture 206, forming the trough, may include grooves (not shown) into which a respective stud is placed, thereby insuring the proper orientation of the inflator, The apparatus 200 includes an upwardly extending member (the extension) 210, which is used as a guide for an intermediate folding step. A shoulder 212 extends from member 210 and the apparatus also includes an associated guide line 214 formed on or marked upon the pallet 202. The pallet 202 may be made from any material including: Plexiglas, wood, aluminum, etc. that is planed upon another work surface. As mentioned above, the shape of the apparatus 200 can be drawn in a work surface if desired (eliminating the need for the pallet) and the first holding member incorporated in the work surface. The apparatus 200 also includes a second holding fixture such as a commonly used manually operated, hold-down clamp 216 with a vertically movable clamping arm 218, that is only diagrammatically shown as it is well known.

The air bag 20 with the inflator installed therein is positioned atop the folding apparatus 200. That part of the air bag surrounding the inflator assembly 30 (as well as the assembly 30) are placed and secured within the first holding fixture 206. As illustrated, the outer panel 22 is located above the lower panel. The air bag being folded will be used in a right-hand installation. The process described below can also be used for the left side seating position. In this case the orientation and construction of the fixture 200 is reversed.

Figure 4:
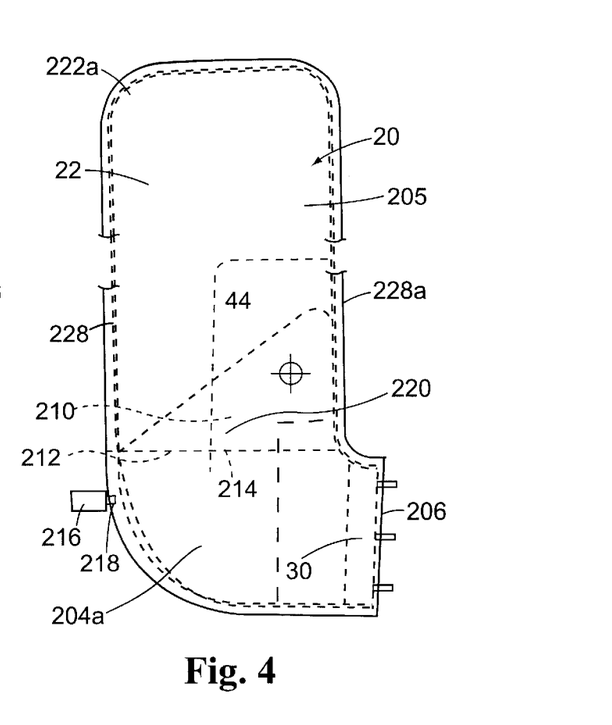
FIG. 4 shows the air bag of FIG. 2 positioned on the folding jig (of FIG. 3).

The lower portion 204a of the air bag 20 is then aligned to the similarly shaped portion 204 of the fixture or jig 200 and the hold-down fixture 216 is manipulated to cause its arm or clamping mechanism 218 to clamp an outer marginal portion of the air bag 20 in place. The upper portions 205 of the air bag 30 are stretched out and laid flat on the work surface as generally shown in FIG. 4. Portions of the folding apparatus 200 such as 204, 210, 212 and 214 are shown in phantom line beneath the laid-out air bag 20.

Figure 5:
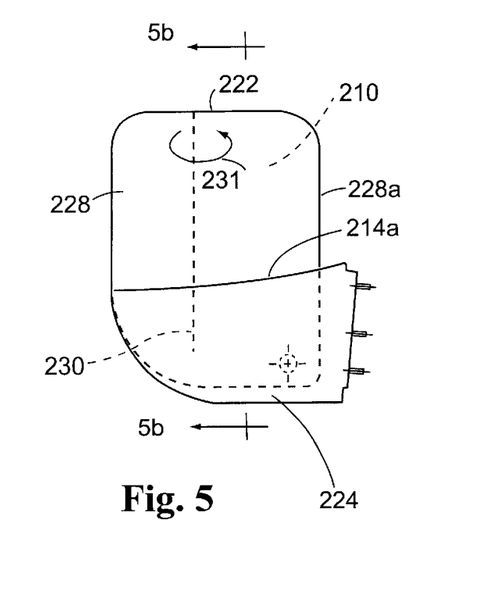
FIG. 5 illustrates the air bag after it has been folded over a first fold line.
Figure 5A:
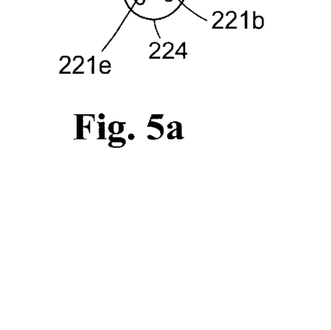
FIG. 5a is a side view of the air bag of FIG. 3.

Thereafter, the operator, who is manually folding the bag or corresponding folding machine, lifts a portion of the top panel (the outer panel 22 in FIG. 4) slightly above the desired fold or tuck line 214a identified by parts 212 and 214 of the pallet 202. The tuck line 214a is located in the upper panel (as illustrated in FIG. 4) which in this configuration is outer panel 22. The portion of the panel that is grabbed and lifted is identified by numeral 220 in FIG. 4. Subsequently, the lower portion 204a of the outer panel is also lifted away from the inner panel 24 and that portion of the outer panel 22. Then a portion of the outer panel 22, just immediately above the guide line 214 (of the fixture) or just above the tuck line 214a (of the panel 22) is tucked inwardly upon itself forming a front tuck 220a. As the air bag material is pushed toward the bottom of the air bag a rear tuck 220b is also formed. During this operation the tucked-in portion of the outer panel is pushed down to the bottom 224 of the air bag, forming respective lower tucks or folds 221a and 221b. The resulting configuration is shown in FIGS. 5 and 5a. The step of tucking that part of the top or outer panel (at the tuck line) inward also pulls down and lowers fabric that was located at the very top 222 of the air bag. In this configuration, a now shortened top 222 or the air bag has been moved inline with the top 222a of the extending portion 210 of the folding apparatus or jig 200 (or pallet or outline 202). If the topmost fabric of the air bag has not been brought in line with the top 222a of the pallet, this is an indication that the outer panel 22 has not been tracked in correctly and this step must be repeated. FIG. 5a diagrammatically shows the position of the inner and outer panels after the above tuck or fold operation. The separator and diverter panels are not shown in FIG. 5a for ease of illustration.

After performing the above step, with the air bag in the configuration of FIG. 5, the width of the air bag from front side 228 to the rear side 228a is still wider than the width of the narrow portion 10 of the folding fixture 200 (which is used as a guide) which represent the desired width of this portion of the air bag. The width of the upper portion of the air bag will be narrowed to make it conform to the width of the pallet or fixture. This is accomplished by defining a fold line, generally shown as 230, which is coextensive (see FIG. 5) with a corresponding edge 230a of the fixture 200. The part of the air bag that is to be folded is the extending upper part 250 of the air bag. This part 250 of the air bag extends from that part of the air bag that has just been tucked into the bottom of the air bag to the now shortened top 222, Arrow 231 of FIG. 5 shows how the material is moved to achieve this next fold about fold line 230. The edge 228 of the extending portion 250 of the air bag is folded about the fold line 230. More particularly, this material is moved forward (out of the plane of the paper), such that after being folded, portions of the outer panel 22 face each other (see FIG. 6a). Also, if the air bag is viewed along the fold line 230 from the top of the air bag (as shown in FIG. 5) to accomplish this fold the forward edge 228 is rotated in a counter-clockwise manner about the fold line. As used in the invention, this type of fold is referred to as an "outward" fold, This type of fold is important in the following context. As mentioned above the outer panel 22, when the bag is inflated, is located adjacent the side of the vehicle. As the air bag is inflating the now narrowed top 250a inflates upwardly and as the air bag continues to inflate, the front edge 228 will rotate in a clockwise manner. In essence the front edge moves away from the occupant, toward the side of the vehicle and is then positioned rearwardly (in the configuration of FIG. 3). This motion keeps this unfolding portion of the air bag away from the occupant thereby avoiding any unnecessary impact with the occupant, especially an out-of-position occupant such as a child that might be nestled at the corner formed by the side of the seat and the side of the vehicle.

Figure 6:
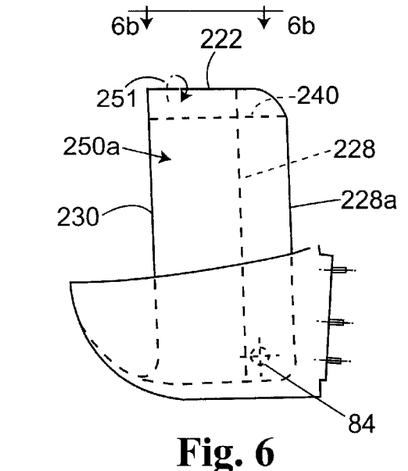
FIGS. 6 and 6a illustrate a top and side view of an intermediate process step in the folding of the air bag.
Figure 6A:
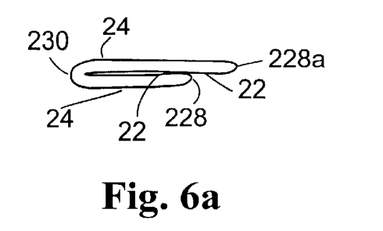

FIG. 6 is a plan view of the air bag 20 after it has been folded over fold line 230. As can be seen, after this step the upper part of the air bag has been narrowed and now conforms to the shape of the upper part of the pallet 202. FIG. 6a is an isolated end view showing only the top of the head chamber of the air bag. The folding apparatus 200 or work surface is not shown in either FIG. 6 or FIG. 6a.

Figure 7:
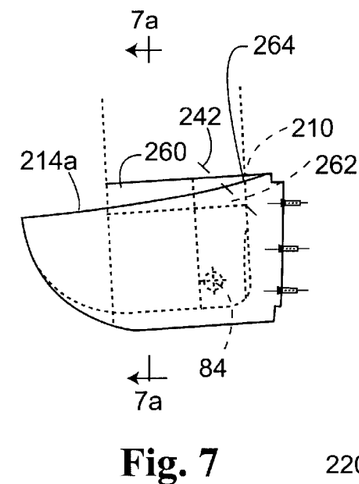
FIGS. 7, 7a and 8 show further intermediate process steps in the folding of the air bag.
Figure 7A:
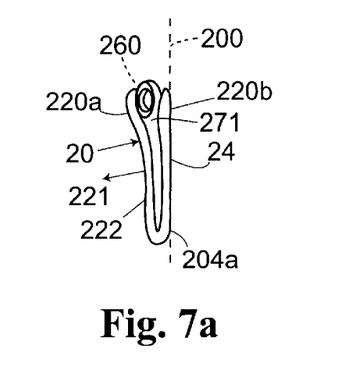

Returning to FIG. 3, it can be seen that the folding apparatus or fixture 200 includes a reference or measurement line 240 that extends across the top of the extending portion 210. This line 240 is located at dimension, d, from the top 222a of the fixture 200 and identifies the preferred dimension (width) of subsequent folds to be introduced into the now narrowed top 250a (see FIG. 6) of the partially folded air bag. It should also be noted that the apparatus 200 also includes a second reference line 242 (see FIGS. 3 and 7) which is used as a guide for a subsequent fold. The top 222 of the air bag (which now lies coextensive with or superimposed on the top 222a of the fixture 200) is folded about the measurement line 240. Subsequently, the top portion 250a is again folded over itself about four or five times. As the narrowed top 250a of the air bag is folded over it begins to resemble a cylinder 260, which in this case is rather flat, as the panels of the air bag are thin and pliable. Arrow 231 (at the top of FIG. 6) shows the direction of the above folds (in relation to FIG. 6, the material is folded back-to-front). These folds are also referred to as outer or outward folds as the material is folded on the outer panel. The top 250a is folded over a predetermined number of times (typically Sour or five times) and the resulting cylinder (or fabric roll) 260 will become positioned generally underneath the outer panel 22 at the original tuck line 214. In this configuration as shown in FIG. 7 (as well as in FIG. 7a) the top of the fabric cylinder 260 is in line with tuck line 214a but it is permissible that the top of the cylinder be slightly above or below the line 214a. In the various figures the tuck line 214a extends downwardly at a slight angle. This orientation will vary with the specific air bag. The tuck line can extend perpendicularly from the location of the inflator or vary somewhat from this orientation.

As the now rolled or folded top portion 250a of the air bag inflates, the various folds forming the fabric roll 260 unfold. By virtue of using an outer fold or roll, the fabric roll is positioned away from the occupant to avoid unnecessary contact with the occupant. The extending portion 210 of the pallet 202 or folding apparatus 200 is only partially shown in FIG. 7. As also illustrated in FIG. 7, the cylinder of fabric (fabric roll) 260 is also positioned adjacent the top of the inflator assembly 30 and generally extends perpendicularly from this assembly. Additionally, FIG. 7 also identifies a portion of the fabric cylinder closest to the inflator assembly by numeral 262, which is used in the next folding step. As can be seen, portion 262 of the fabric roll 260 is positioned above and passes over the angled, second reference line 242. A corner 264 (located in the top-right part of the fabric roll 260) of the fabric roll 260, near the inflator assembly 30 is brought over the adjacent material of the roll 260 and is folded forwardly (rearwardly) about the fold line 242.

Figure 8:
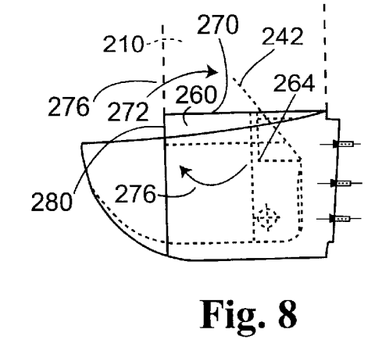
Figure 9:
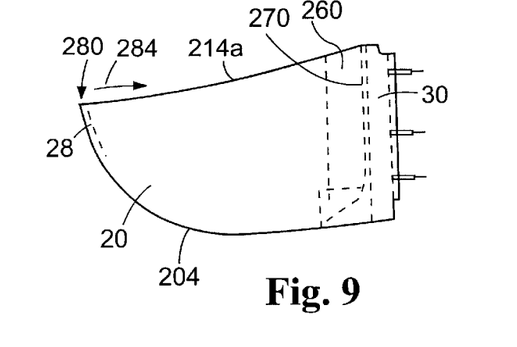
FIGS. 9 and 9a illustrate another process step.
Figure 9A:
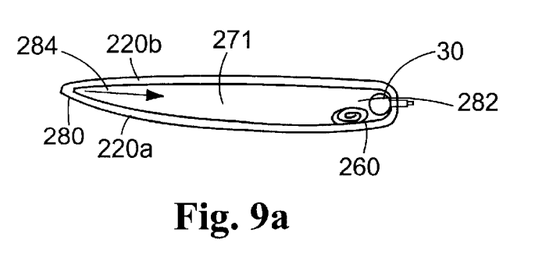
Figure 10:
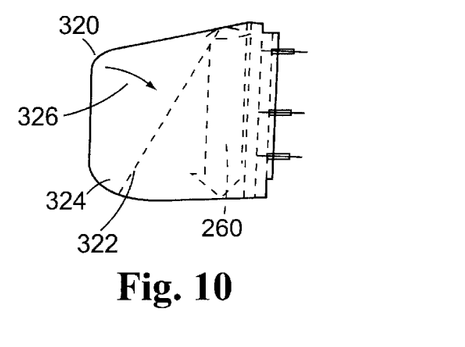
FIGS. 10 and 10a show another step of the process where the width of the lower portion of the air bag is lessened.
Figure 10A:
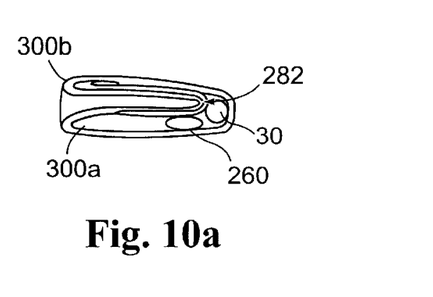

For reference purposes, the top of the fabric roll 260 is identified by numeral 270 and the left end by numeral 272. As can be appreciated, the fabric roll 260 is located at the top of a cavity 271 created by the lower portions of the inner and outer panels 24 and 22 respectively and the initial tucks 220a,b. With the inflator assembly 30 preferably still secured to the fixture 206 and with the hold-down clamp 216 still holding the lower portion 204 of the air bag to the fixture, the spacing or distance between the panels 22 and 24 is increased This is simply done by raising the outer panel 22 slightly in the direction of arrow 221. With the outer panel 22 elevated, the fabric roll 260 is repositioned with the cavity. The fabric roll, starting with the configuration shown in FIG. 8 (which includes the folded-over corner 264) is rotated clockwise 90 degrees, as shown by arrow 276. As the fabric roll is rotated, it is manipulated so that the folded corner is pointing at the bottom of the air bag, tho top 270 of the roll 260 is against the inflator assembly 30, the end 272 is near the top of the inflator and the fabric roll is located against the inside of the outer panel 22. Any other fabric at the bottom of the air bag is positioned on the side of the fabric roll 260 opposite the outer panel. This relationship is shown in FIGS. 9 and 9a.

when the air bag is initially inflated, the lower portions of the air bag will inflate generally at the lower portion of the tucks 220a and 220b. As more inflation gas enters into the air bag, the gas will migrate into the lower portion of the fabric roll and tend to move the fabric roll from its position as shown in FIG. 9 to that position shown in FIG. 7. As can be seen in this configuration of FIG. 9a, the fabric roll 70 is enveloped by a first and second wall of material formed by tucks 220a and 200b. The walls of material extend from a portion of seam 28. Thereafter, the point 280 is grabbed and moved to point 282 as shown in FIG. 9a. To accomplish this, it might be easier to disconnect the air bag and inflator from the fixture 200, but this is not necessary. Arrow 284 shows the direction of motion of point 280 at the far corner of the partially folded air bag as it will be moved to point 282 adjacent the inflator subassenbly and fabric roll 260. Moving point 280 of the air bag and placing it generally at the inflator creates two additional folds or tucks 300a and 300b in the inner and outer panels. FIGS. 10 and 10a show the air bag after the above step.

Figure 11:
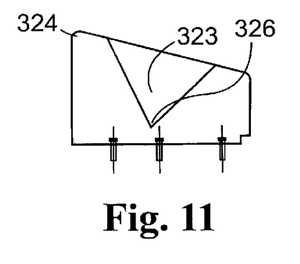
FIGS. 11 and 11a illustrate a top and side view of a folded air bag.
Figure 11A:
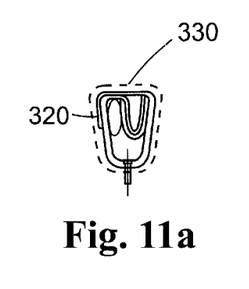
Figure 12:
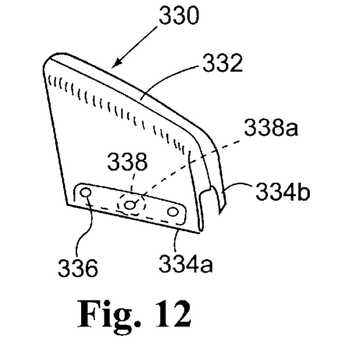
FIG. 12 shows an isolated view of a tearable air bag cover.

One of the corners such as 320 (such as the top left corner as viewed in FIG. 10) is folded about another fold line 322. This fold line 322 runs from the top of the fabric roll to the vicinity of the corner 324. Arrow 326 shows the direction of this fold. The resulting configuration after the corner 320 (which now forms a flap 323) has been folded over line 322 is shown in FIG. 11. As can be seen, the resulting folded air bag has a generally trapezoidal shape. The air bag shown in FIG. 11 is enveloped with a flexible, tearable cover 330. The cover 330 is shown in FIG. 12. Tho cover, in the preferred embodiment of the invention, is made of a thin (10 mil), flexible, urethane plastic sheet that is formed to have a shape that is generally that of the folded air bag. The cover 330 includes a weakened region 332. This weakened zone can be achieved by a series of perforations in the cover material or making the cover locally very thin. As the air bag inflates it causes the cover to be ripped at the weakened region 332. The cover holds the air bag in its folded configuration.

The cover is preferably made of a clear plastic so that the folded air bag is visible. The cover 330 includes two flaps 334a and 334b. Each of the flaps includes a like plurality of mounting openings 336 spaced in the manner as openings 25. To prevent the thin cover from tearing at the openings 336, a reinforcement layer 338 is secured to the flaps. This layer can be a single band as illustrated or separate circles of reinforcement as shown by the dotted line 338a. The reinforcement layer, which can also be urethane, can be attached by heat welding, sewing or other procedure that is compatible with the material. After the air bag is positioned in the cover 330, the flaps 334a and 224b are manipulated about the extending mounting studs 33 of the housing or inflator.

Figure 13:
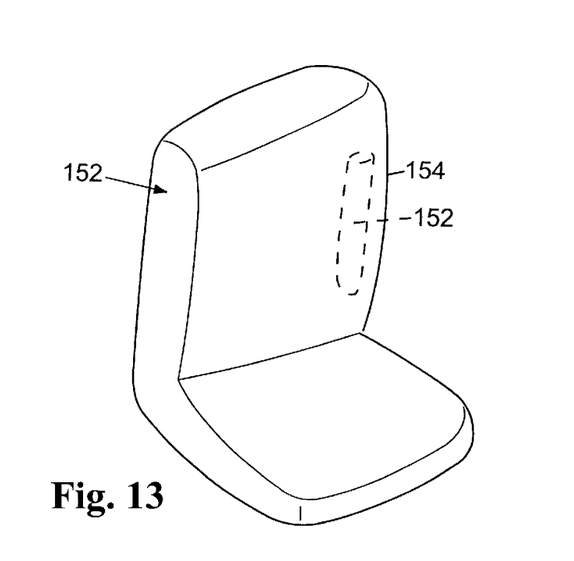
FIG. 13 shows an air bag module installed within a vehicle seat.

Reference is made to FIG. 13 which shows an air bag module 150 installed within a vehicle seat 152. The module comprises the air bag 20, inflator 30 and housing 34. Upon activation of the inflator, the air bag begins to inflate and rips through the seat 152 at a preferred location such as at an outboard, forward seam 154 in the seat back.

Many changes and modifications in the above-described embodiment of the invention can, of course, be carried out without departing from the scope thereof. Accordingly, that scope is intended to be limited only by the scope of the appended claims.

What is claimed is:

1. A method of folding an air bag, the air bag having a top, a bottom, facing first or upper and second or lower panels that are joined together, a portion of each panel cooperating to form a neck or inlet which is adapted to receive an inflator, the method comprising the steps of:

a) arranging the first and second panels to be generally flat on a work surface with the first panel overlaying the second panel;

b) defining a first fold or tuck line in the first panel;

c) identifying an upper portion of the first panel that is located above the first fold line, and tucking this upper portion behind a lower portion of the first panel and pushing a part of the upper portion generally to the bottom of the air bag, the tucking of the upper portion at the first fold line creating a first fold or tuck in the first panel at the first fold line and the moving of the first panel to the bottom thereby creating a second fold in the first panel, which is located near the bottom, the first panel extending from the second fold, beyond the first fold line so that the top of the air bag is a determinable distance from the first fold line; the above step lowering the top of tho air bag in relation to its laid-out configuration in step a to create a reduced height upper portion of the air bag;

d) identifying a third fold line in the reduced height upper portion of the air bag, this third fold line generally extending across the reduced height upper portion from the second fold to the top of the air bag;

e) folding the reduced height upper portion generally about the third fold line to reduce the width of the reduced height upper portion thereby forming a reduced width portion;

f) folding or rolling the reduced width portion toward the first fold line, the folding forming a fabric roll, the fabric roll after the rolling or folding of this step is positioned generally in line with the first fold line;

g) rotating the fabric roll so that an end thereof that was pointing toward the inflator is positioned facing the bottom of the air bag and a top of the roll now lies adjacent the inflator;

h) moving a portion of the air bag generally opposite the repositioned fabric roll toward the location of the fabric roll and in doing so, forming two opposing pleats in the upper and lower panels, wherein both of the pleats are positioned to lay behind the fabric roll, that is, positioned closer to the lower panel;

i) identifying an angled fold line in the partially folded air bag;

j) moving a corner of the air bag about the angle fold line generally toward the inflator to form a generally trapezoidal configuration of the folded air bag;

k) enveloping the air hag with a tearable cover.

2. A method of folding an air bag, the air bag having a bottom, a top, facing first or upper and second or lower panels that are joined together, a portion of each panel cooperating to form a neck or inlet which is adapted to receive an inflator, the method comprising the steps of:

a) arranging the first and second panels to be generally flat on a work surface with the a first panel overlaying a second panel;

b) defining a first fold or tuck line that extends across the first panel and a second fold or tuck line that extends across the second panel;

c) forming a double tuck in both the first and second panel, the double tuck including a first and second tuck in each of the first and second panels, each first tuck located on a preferred portion of the first and second panels generally at the respective first tuck line and each second tuck generally located near the bottom of the air bag; the tucking of the panels lowering the height of the air bag defining a lowered height portion in relation to its laid-out configuration in step a as well is its relating to the first tuck line;

d) reducing the width of the lowered height portion of the air bag that extends from the second tuck to the top of the air bag;

e) folding or rolling the reduced width portion toward the first fold line, the folding forming a fabric roll, the fabric roll after the rolling or folding of this step being positioned generally in line with the first fold line;

f) manipulating the fabric roll so that lies generally parallel to the inflator and generally positioned between the tucks formed in the panels as a result of step c;

g) reducing a first dimension of the partially folded air bag, the first dimension measured from the location of the inflator to an opposing side of the partially folded air bag;

h) folding over a portion of the air bag to reduce a second dimension of the air bag measured from the inflator to a side opposite the inflator to obtain a generally trapezoidal configuration for the folded air bag.

3. The method as defined in claim 2 wherein the step of reducing the width includes folding the reduced height portion of the air bag so that when it unfolds, the direction of unfolding is away from an occupant to be protected.

4. The method as defined in claim 2 wherein the step of folding or rolling toward the first fold line includes folding the reduced height of the air bag so that when it unfolds or unrolls, the direction of unfolding is away from an occupant to be protected.

5. A method of folding an air bag, the air bag having a bottom, a top, facing first or upper and second or lower panels that are joined together, a portion of each panel cooperating to form a neck or inlet which is adapted to receive an inflator, the method comprising the steps of:

a) arranging the first and second panels to be generally flat on a work surface with the a first panel overlaying a second panel;

b) defining a first fold or tuck line that extends across the first panel and a second fold or tuck line that extends across the second panel;

c) forming a double tuck in both the first and second panel, the double tuck including a first and second tuck in each of the first and second panels, each first tuck located on a preferred portion of the first and second panels generally at the respective first tuck line and each second tuck generally located near the bottom of the air bag; the tucking of the panels lowering the height of the air bag defining a lowered height portion in relation to its laid-out configuration in step a as well is its relating to the first tuck line.

6. The method of claim 5 including the steps of d) reducing the width of the lowered height portion of the air bag that extends from the second tuck to the top of the air bag;

e) folding or rolling the reduced width portion toward the first fold line, the folding or rolling forming a compact portion, the compact portion after the rolling or folding of this step being positioned generally in line with the first fold line;

f) manipulating the compact portion so that lies generally parallel to the inflator and generally positioned between the tucks formed in the panels as a result or step c;

g) reducing a first dimension of the partially folded air bag, the first dimension measured from tho location of the inflator to an opposing side of the partially folded air bag;

h) folding over a portion of the air bag to reduce a second dimension of the air bag measured from the inflator to a side opposite the inflator.

7. The method of claim 6 wherein step 6 includes folding over a portion of the air bag to reduce a second dimension of the air bag measured from the inflator to a wide opposite the inflator to obtain a generally trapezoidal configuration for the folded air bag.

8. The method as defined in claim 6 wherein the step of reducing the width includes folding the reduced height portion of the air bag so that when it unfolds, the direction of unfolding is away from an occupant to be protected.

9. The method as defined in claim 6 wherein the step of folding or rolling toward the first fold line includes folding the reduced height of the air bag so that when it unfolds or unrolls, the direction of unfolding is away from an occupant to be protected.

* * * * *